United States Patent [19]

Inaba et al.

[11] 4,204,687
[45] May 27, 1980

[54] TONE ARM DRIVE DEVICE

[75] Inventors: Shizuo Inaba; Yoshihisa Hirota, both of Tokorozawa, Japan

[73] Assignee: Pioneer Electronic Corporation, Tokyo, Japan

[21] Appl. No.: 943,514

[22] Filed: Sep. 18, 1978

[30] Foreign Application Priority Data

Sep. 20, 1977 [JP] Japan ................................ 52-112940

[51] Int. Cl.$^2$ ............................................. G11B 17/06
[52] U.S. Cl. .................................................. 274/15 R
[58] Field of Search ..................... 274/13 R, 14, 15 R, 274/23 R, 23 A, 9 R, 9 RA

[56] References Cited
U.S. PATENT DOCUMENTS 4,049,279   9/1977   Kleis .................................. 274/15 R

*Primary Examiner*—Harry N. Haroian
*Attorney, Agent, or Firm*—Sughrue, Rothwell, Mion, Zinn and Macpeak

[57] ABSTRACT

A tone arm drive device, comprises a tone arm drive mechanism driven by an electric motor rotatable in forward and reverse directions to vertically move and horizontally swing a tone arm. A first flip-flop circuit is triggered by signals instructing elevation and descent of said tone arm and a first logical gate generates an output of a logical product of a signal instructing a lowering position of the tone arm and an output signal of the first flip-flop circuit. A detecting circuit is employed to sense the upward movement limit point of said tone arm. A set-reset type flip-flop circuit receives an output from the first logical gate and an output of the detecting circuit as a "set" input and a "reset" input, respectively. A second logical gate is used for generating a logical product output of an output signal of the first flip-flop circuit and an output signal of the set-reset type flip-flop, with the output signal thereof being employed as a tone arm vertical movement control signal.

9 Claims, 8 Drawing Figures

TONE ARM DRIVE DEVICE

BACKGROUND OF THE INVENTION

This invention relates to a tone arm drive device, and more particularly to a tone arm automatic drive device in an audio record player.

The tone arm of an audio record player is moved upwardly upon leaving the arm rest at the time when record playback is to start, and after being swung horizontally to the playback start point above the record disk, the tone arm is then lowered onto the surface of the disk. When record playback is complete, the tone arm is elevated from the surface of the record disk, horizontally swung back to the arm rest, and finally lowered onto the arm rest. A variety of audio record players having an automatic playback device automatically carrying out a series of tone arm operations as described above are known in the art. With this type of record player, upon the start of automatic playback, a tone arm elevation mechanism is first operated to elevate the tone arm above the arm rest, and then it is horizontally swung to the playback start point on the record disk. That is, a so-called "lead-in" operation is carried out.

During the lead-in operation, the automatic playback start can be temporarily suspended by performing an elevation instruction operation, if necessary. In this case, the lead-in operation is continued, and when the tone arm reaches the playback start point on the record disk, a descent position signal is generated to stop the operation of the automatic playback device. The tone arm is maintained stationary above a position to which it is to be lowered, because an "elevation" instruction is maintained in the internal electrical circuit by the elevation operation performed previously. Accordingly, as described later, the tone arm drive mechanism is maintained mechanically engaged with the tone arm. Therefore, it is substantially impossible for the operator to move the tone arm to other positions above the record disk. This is a substantial inconvenience and disadvantage of such systems.

Conversely, when the automatic playback start instruction operation is performed after the elevation instruction, in order to elevate the tone arm initially, the tone arm is elevated in response to the elevation instruction. Thereafter, the tone arm is horizontally swung in response to the automatic playback instruction. When the descent position signal is generated by the descent position detector, the tone arm is stopped at the position without lowering itself, because the circuit is maintained in an "elevation" instruction state by the elevation instruction. Accordingly, similarly as in the above-described case, it is difficult for the operator to move the tone arm.

SUMMARY OF THE INVENTION

Accordingly, an object of this invention is to provide a tone arm drive device with which the tone arm can be freely moved.

It is another object of this invention to provide for a tone arm drive mechanism that has a mode of operation allowing for convenient use and positioning of the tone arm.

These and other objects of this invention are accomplished in a novel tone arm device having a drive mechanism driven by a reversible electric motor to vertically move and horizontally swing the tone arm. A first flip-flop circuit is used to sense elevation and emits an output response to signals for such movement. A first logic gate generates an output that is the logical product of a signal instructing a lowering of the tone arm and the output signal of the first flip-flop. A detecting circuit senses the upward movement limit point of the tone arm. A set-reset flip-flop receives an output from the first logical gate and an output from detecting circuit to be used as "set" and "reset" inputs. A second logical gate is used for generating a logical product output of the output signals from the first flip-flop and the set-reset flip-flop. The output of the second logical gate is employed as a tone arm vertical movement control signal.

This invention will be described in detail with respect to the drawings and the description of the preferred embodiment which follow.

BRIEF DESCRIPTION OF THE DRAWINGS

FIG. 1 shows an example of a tone arm drive mechanism employed in this invention. More specifically.

DESCRIPTION OF THE PREFERRED EMBODIMENT

Figure 1A:
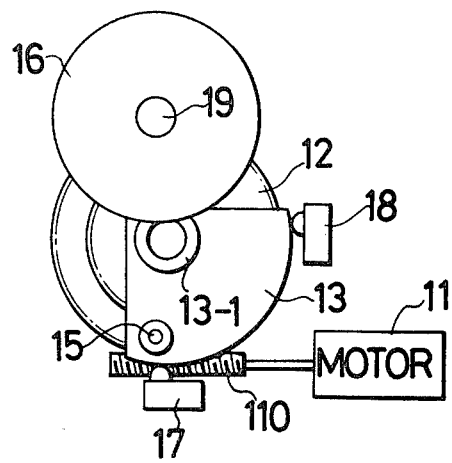
FIG. 1(a) is a plan view showing the tone arm drive mechanism.
Figure 1B:
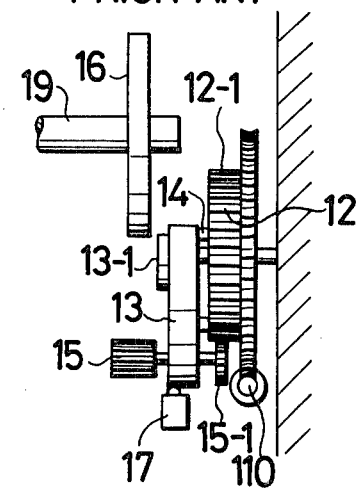
FIG. 1(b) is a side view showing a part of the tone arm drive mechanism.

Referring now to FIG. 1, one example of a tone arm drive mechanism employed in the invention is shown. More specifically, FIG. 1(a) is a plan view of the mechanism, and FIG. 1(b) is a side view showing a part of the mechanism.

In FIG. 1, a reversible motor 11 revolves in either the forward or reverse direction. Rotation of the motor 11 is transmitted through a power transmission mechanism 110 to a disk-shaped rotary member 12, which is coaxially coupled through a friction coupling member 14 to a sector-shaped cam 13. Rotation of the rotary member 12 is therefore transmitted to the cam 13 by the use of friction in the friction coupling member 14.

A roller 15 is mounted rotatably on the cam 13 as shown in FIG. 1. The roller 15 is provided with a gear section 15-1 which engages a rear section 12-1 of the rotary member 12, so that the roller 15 will rotate and revolve as the rotary member 12 is rotated. When a tone arm vertically moving mechanism (not shown) engages the cam surface 13-1 of the cam 13, the tone arm is vertically moved according to the rotation of the cam 13. As shown in FIG. 1, a rotary drive board 16 is provided around a tone arm rotation shaft 19.

Switches 17 and 18 for detecting the position of the cam 13 are provided in such a manner that they are closed by both ends of the circumferential wall of the cam 13, respectively, when the drive mechanism is not operated. This is the position shown in FIG. 1. Accordingly, if the cam 13 is rotated to right or left from its position shown in FIG. 1, either switch 17 or 18 will be disengaged from the circumferential wall of the cam 13, as result of which it is opened. Thus, switches 17 and 18 can detect when the drive mechanism is not in operation.

Figure 3A:
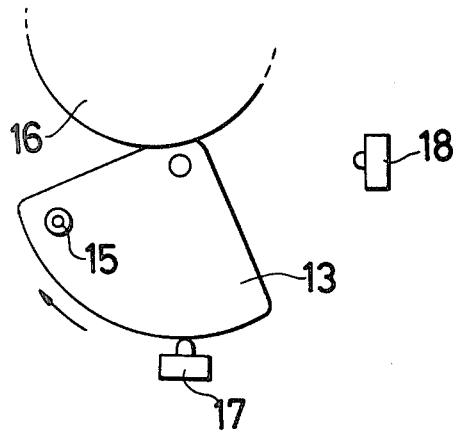
FIG. 3(a—e) is a schematic diagram for a description of the operation of the drive mechanism shown in FIG. 1.

The operation of the tone arm drive mechanism shown in FIG. 1 will now be described with reference to FIGS. 3(a), (b) and (c). When under the condition shown in FIG. 1(a) the motor 11 starts its rotation clockwise in response to a playback start signal, the rotation of the motor 11 is transmitted through the transmission mechanism 110 to effectuate rotation of the rotary member 12 in a clockwise direction. The rotation of the rotary member 12 is transmitted through the friction member 14 to the sector-shaped cam 13 to turn it clockwise. As a result, the tone arm vertically moving mechanism engaged with the cam surface 13-1 of the cam 13 moves the tone arm upwardly. The operation of the cam 13 at this instant is as shown in FIG. 3(a).

Figure 3B:
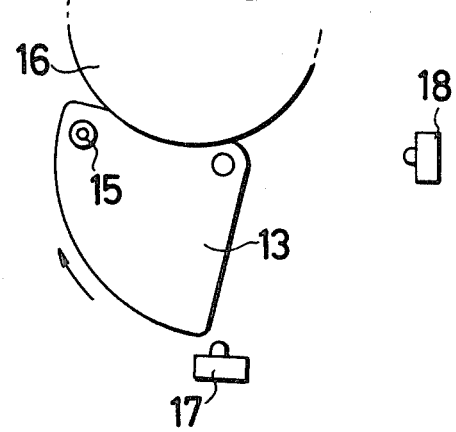

When the cam 13 is turned in a further clockwise direction, the switch 17 is disengaged from the circumferential wall of the cam 13 and is therefore opened as shown in FIG. 3(b). Thus, the upward movement limit point of the tone arm can be detected by the switch 17.

When the cam 13 is turned further, the roller 15 on the cam 13 engages the circumferential wall of the rotary drive board 16. As a result, the rotation of the cam 13 is stopped, however, the roller is turned counterclockwise as it is maintained engaged with the gear section 12-1 of the rotary member 12. Accordingly, the rotary drive board 16 is rotated clockwise to permit the tone arm secured to the tone arm rotation shaft thereof to horizontally turn in a circumferential direction of a record disk. When the tone arm reaches the record playback start point, a suitable descent position detector well known in the art provides a descent position instruction signal. The motor 11 is reversed and rotated counterclockwise. As a result of this counterclockwise rotation, the rotary drive board 16 is disengaged from the roller 16, and the horizontal movement of the tone arm is stopped. As the motor 11 rotates further counterclockwise, the elements are moved as shown in FIGS. 3(b) and (a) and FIG. 1(a) are obtained in the described order. Thus, the tone arm is moved downward onto the record.

Figure 3C:
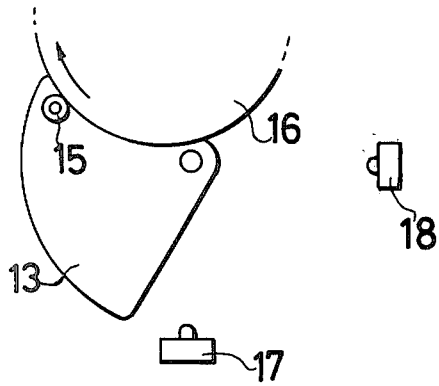

The above-described tone arm drive mechanism and drive circuit are well known in the art. As was described before, if the elevation instruction operation is effectuated in leading in the tone arm during an automatic playback, the tone arm is stopped in a state as shown in FIG. 3(c), that is, the rotary drive board 16 is maintained engaged with the roller 15 of the cam 13. Therefore, in this situation it is difficult to freely move the tone arm. Also, when automatic playback is started after the elevation operation, the state as shown in FIG. 3(c) is obtained, and accordingly it is difficult to move the tone arm.

Figure 2:
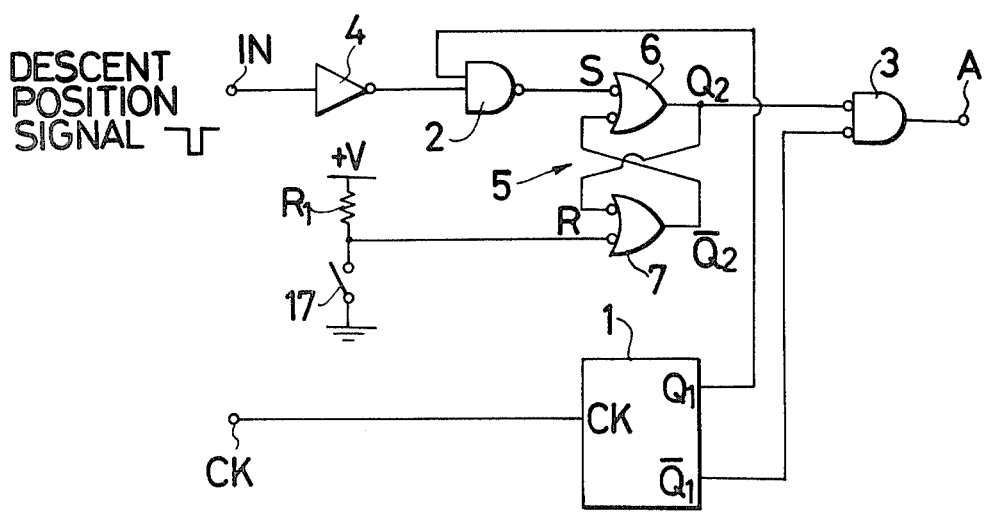
FIG. 2 is a block diagram showing one embodiment of this invention.

In order to overcome this difficulty, a circuit shown in FIG. 2, according to the invention, is added to the well-known drive circuit to drive the tone arm drive mechanism shown in FIG. 1.

Referring now to FIG. 2, flip-flop 1 is a so-called T type flip-flop which changes its state whenever a pulse is applied to its clock input terminal CK. The clock input CK is a signal based on the tone arm elevation operation instruction. The outputs Q1 and $\overline{Q1}$ of the flip-flop are opposite in polarity to each other. The output Q1 is applied to one of the inputs of a NAND gate 2, while the output $\overline{Q1}$ is applied to one of the inputs of a negative logic AND gate 3. A lowering position signal, or descent signal, from the above-described lowering position detector is applied through a terminal IN to an inverter circuit 4, where it is inverted and is then applied to the other input of the gate 2. The output of the gate 2 is the "set" input S of a set-reset type flip-flop 5 having set and reset terminals. The flip-flop comprises two negative logic OR gates 6 and 7. The output Q2 of the flip-flop 5 is applied to the other input of the gate 3. A voltage developed at the connection point between the above-described switch 17 and a resistor R1 is applied to the "reset" input R of the flip-flop 5. Accordingly, a low level signal is applied to the "reset" input R of the flip-flop 5 when the switch 17 is closed, and a high level signal is applied when it is opened.

The output of gate 6 of the set-reset type flip-flop is applied to one of the inputs of the gate 7, and the output of the gate 7 is applied to one of the inputs of the gate 6. The output terminal A of the gate 3 is employed as a tone arm vertical movement control signal. In this embodiment, when the output at A is at a high level, the signal is used as an elevation control signal, and when it is at the low level, it is used as a lowering control signal.

The operation of the circuit shown in FIG. 2 will now be described with reference to FIGS. 1 and 3. When the tone arm is on the arm rest or the state as shown in FIG. 1(a) is obtained, the switch 17 is closed. Therefore, the flip-flop 5 is reset, and the output Q2 is at the low level while the output $\overline{Q2}$ is at the high level. When the power switch is turned on, the T-type flip-flop 1 is reset, and the output Q1 is at the low level, and the output $\overline{Q1}$ is at the high level. Accordingly, the output at A of the negative logic AND gate 3 is at the low level, and the lowering control signal is thus provided. It is assumed that, in this state, the motor 11 is stopped by the drive circuit (not shown).

If, under this condition, the elevation operation instruction is issued to elevate the tone arm, the pulse signal is applied to the clock input terminal CK of the flip-flop 1. As a result its state is changed, that is, the output Q1 is raised to the high level while the output $\overline{Q1}$ is lowered to the low level. Thus, the output at A of the gate 3 is raised to the high level and is employed as the elevation control signal. With this control signal, the motor 11 starts rotation in a clockwise direction, and the condition shown in FIG. 1(a) is changed successively to the states shown in FIG. 3(a) and (b). In this case, the "reset" input of the set-reset type flip-flop 5 is at the high level and since the flip-flop 5 is made up of the negative logic OR gates, the flip-flop 5 is maintained reset. The output A of the gate 3 is maintained unchanged to provide the elevation control signal.

Upon the issuance of an automatic playback start instruction under this condition, the motor 11 is further rotated clockwise by the drive circuit (not shown) adapted to drive the automatic playback mechanism and the roller 15 therefore engages the rotary drive board 16 as shown in FIG. 3(c). Therefore, the tone arm is turned horizontally. When the tone arm reaches a predetermined position that is the record playback start point, the descent position signal at the low level is applied to the input terminal IN by the descent position detector.

Accordingly, the output of the inverter circuit 4 which forms one input to the gate 2 is raised to the high level and the other input of the gate 2 is at the high level. Therefore the output of the gate 2 is lowered to the level, which sets the set-reset type flip-flop 5. As a result the output Q2 thereof is raised to the high level. Accordingly, the output A of the negative logic AND gate 3 is changed to the low level to provide the lowering control signal. Thus, the motor 11 is rotated counterclockwise. The cam 13 will turn counterclockwise also, and the state shown in FIG. 3(c) is changed to a state shown in FIG. 3(d).

Figure 3D:
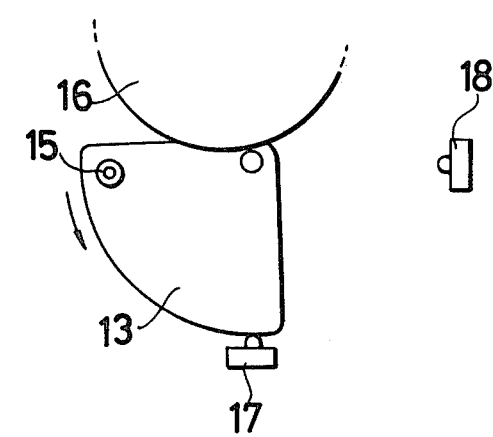
Figure 3E:
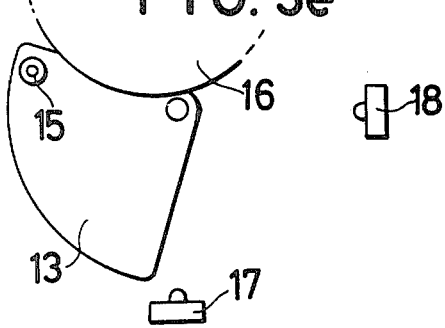

In this operation, switch 17 engages cam 13 again, and it is closed. Therefore, the reset input R of the flip-flop 5 is lowered to the low level. Since the gate 7 receiving the reset input R carries out negative logic operation, the flip-flop 5 is reset so the output Q2 is at the low level while the output Q2 is at the high level. Thus, the output A of the gate 3 is raised to the high level again to provide the elevation control signal. As the motor 11 is rotated clockwise by this signal, the cam 13 is also turned clockwise and a state shown in FIG. 3(e) is obtained. That is, the switch 17 is again disengaged from the cam 13. With the aid of a signal from the switch 17, the rotation of the motor is stopped by the drive circuit (not shown) adapted to drive the automatic playback mechanism, and the cam 13 is stopped as shown in FIG. 3(e).

Following horizontal turning, the tone arm is stopped above the record at the descent position and the roller 15 of the cam 13 is not in engagement with the rotary drive board 16. Accordingly, the tone arm is disengaged from the drive mechanism. Therefore, the tone arm can be readily moved to a desired position over the record by the hand.

On the other hand, when the automatic playback start instruction is issued with the flip-flops 1 and 5 reset, the drive circuit of the automatic playback mechanism is operated to rotate the motor 11 clockwise and the cam is turned as shown in FIG. 3(a), and successively through FIGS. 3(a), (b) and (c) in the described order. As the cam is turned, the tone arm is elevated, carrying out the lead-in operation. If, under this condition, the elevation operation instruction is issued to suspend the automatic playback, the high level pulse input is applied to the clock input CK of the flip-flop 1 to change the state of the latter 1. The outputs Q1 and Q1 are changed to the high and low levels, respectively.

Accordingly, the output A of the gate 3 is raised to the high level to provide the elevation control signal. In this operation, the motor 11 is still maintained for clockwise rotation by the drive circuit. Therefore, the clockwise rotation of the motor 11 continues until the low level signal is generated by the lowering position detector. Upon application of the descent position signal to the input terminal IN, the output of the gate 2 is changed to the low level, the set-reset type flip-flop 5 is set, and therefore the output Q2 is raised to the high level. Accordingly, the output A of the gate 3 is raised to the high level to provide the descent control signal. With this signal the rotation of the motor 11 is reversed to the counterclockwise direction and the state shown in FIG. 3(d) is obtained.

In this case, the switch 17 engages the cam 13 and is therefore closed. Thus, the flip-flop 5 is reset. The state of the flip-flop 5 is thus changed and the output Q2 has the low level. Hence, the output A of the gate 3 is raised to the high level to provide the elevation control signal, and therefore the motor 11 is rotated clockwise again and the state as shown in FIG. 3(e) is obtained. The switch 17 is opened again, and the drive circuit of the automatic playback drive mechanism is controlled to stop the motor.

In this example, similarly as in the above-described case, the arm is stopped above the record lowering position, and the roller 15 is in disengagement from the rotary drive board 16. Accordingly, the tone arm can be freely moved by the hand.

As is clear from the above description, according to this invention, even if the automatic playback is suspended during the movement of the tone arm, the tone arm can be swung freely because the tone arm is not coupled to the drive mechanism. Thus, the operator can move the tone arm to a desired position above the record disk.

In the above-described example, the negative logic AND gate 3 is employed; however, it is ovbious that a NAND gate is employed therefore in the case of positive logic. Other variations will also be apparent from this description without departing from the essential scope of this invention.

We claim:

1. A tone arm drive device comprising;
a reversible electric motor;
tone arm drive means responsive to said rotation of said motor to vertically move and horizontally swing a tone arm;
flip-flop means responsive to signals indicative of vertical movement of said tone arm, said vertical movement comprising elevation and descent of said tone arm, and generating an output in response thereto;
first logical gate means for generating an output of a logical product of a signal for descent of said tone arm and the output from said flip-flop means;
means for detecting an upward movement limit point of said tone arm and generating an output in response thereto;
a set-reset flip-flop receiving outputs from the first logical gate means and the detecting means and generating an output signal therefrom, the output from said first logical gate means being a set input and the output from the detecting means being a reset input to said set-reset flip-flop; and
second logical gate means for generating logical product output of the output from said flip-flop means and the output signal from the set-reset type flip-flop and generating an output control signal, said output control signal employed to control vertical movement of said tone arm.

2. The apparatus of claim 1 wherein said tone arm drive means comprises;
a disk-shaped rotary member rotated by said electric motor;
a cam member having a sector shape rotated in association with said rotary member by frictional engagement;
a roller disposed at a predetermined position on said cam and rotated through engagement with a gear section provided on said rotary member;
a shaft for mounting said tone arm for swinging motion;
a tone arm rotary drive board secured to said shaft, said drive board rotated with said roller when said roller reaches a predetermined position; and
a member disposed on said cam member for vertically moving said tone arm as said cam is rotated.

3. The apparatus of claim 2 wherein said detecting means comprises;
a switch that is disengaged from the circumferential wall of said cam when said cam is turned through a predetermined angle.

4. The apparatus of claim 1, 2 or 3 wherein said flip-flop means generates first and second output signals of opposite polarity, said first output signal being applied to one input of said first logical gate means and said second output signal being applied to one input of said second logical gate means.

5. The apparatus of claim 1 further comprising means to invert the signal indicating the descent of said tone arm for supplying a high level input to said first logical gate means.

6. The apparatus of claim 5 wherein said set-reset flip-flop comprises a plurality of negative logic OR gates.

7. The apparatus of claim 6 wherein flip-flop means comprises a T-type flip-flop having a clock input and changing its state whenever a clock pulse is applied thereto.

8. The apparatus of claim 7 wherein said first logical gate means comprises a NAND gate.

9. The apparatus of claim 8 wherein said second logical gate means comprise a negative logic AND gate.

* * * * *